June 12, 1923.
A. T. SAMPSON
1,458,916
ADJUSTABLE ARMORED BRACKET
Original Filed May 7, 1917
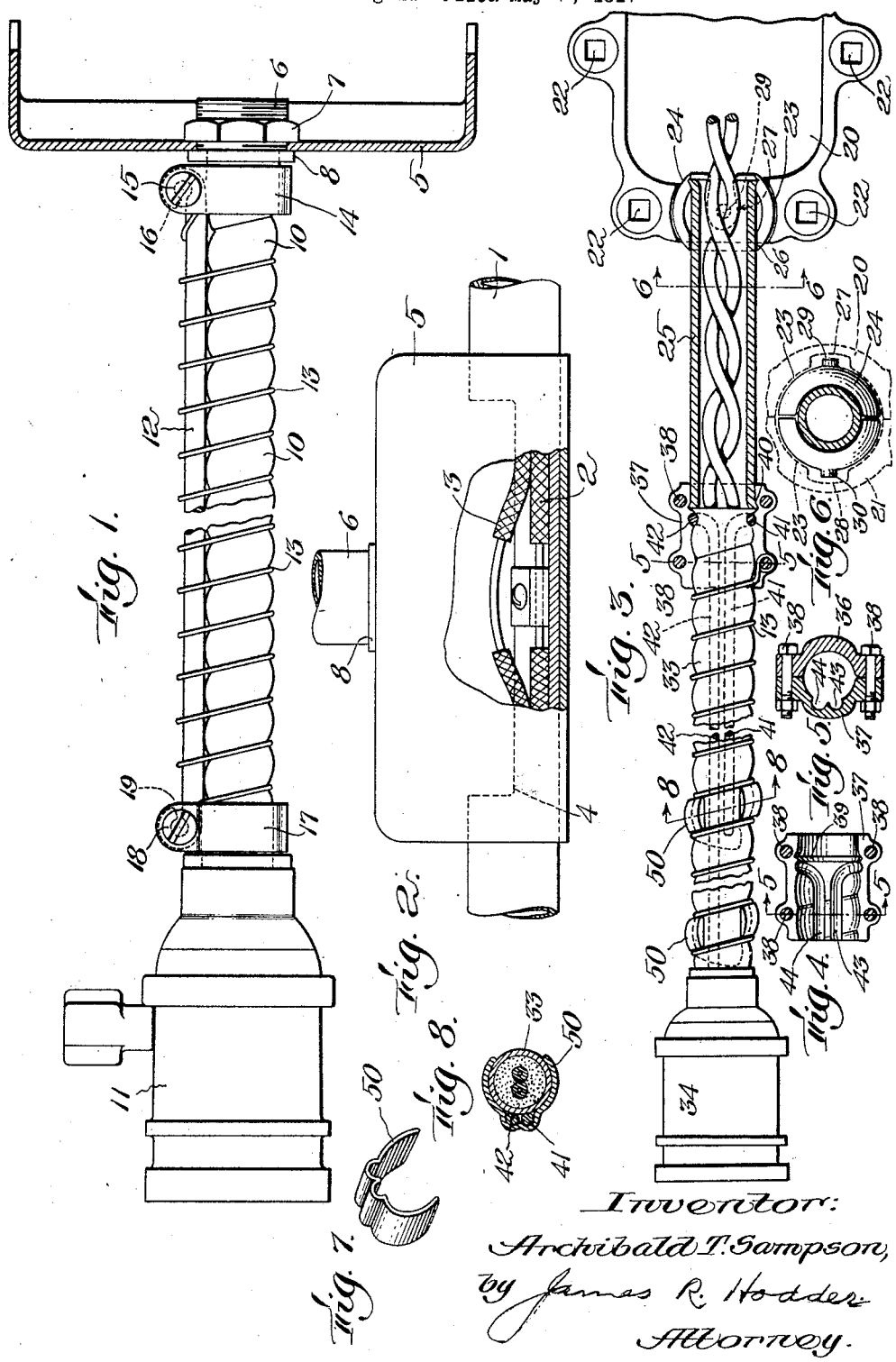
Inventor:
Archibald T. Sampson,
by James R. Hodder
Attorney.

Patented June 12, 1923.

1,458,916

UNITED STATES PATENT OFFICE.

ARCHIBALD T. SAMPSON, OF LYNN, MASSACHUSETTS, ASSIGNOR TO SAMPSON AXCESS SYSTEM, INC., OF LYNN, MASSACHUSETTS, A CORPORATION OF MASSACHUSETTS.

ADJUSTABLE ARMORED BRACKET.

Continuation of application Serial No. 166,813, filed May 7, 1917. This application filed March 23, 1918, Serial No. 224,395. Renewed August 21, 1919. Serial No. 319,044.

*To all whom it may concern:*

Be it known that I, ARCHIBALD T. SAMPSON, a citizen of the United States, and resident of Lynn, in the county of Essex and State of Massachusetts, have invented an Improvement in Adjustable Armored Brackets, of which the following description in connection with the accompanying drawings, is a specification, like letters on the drawings representing like parts.

My present invention is upon an adjustable and flexible supporting bracket, particularly intended for use in connection with electrical power or light installation, being a continuation of my prior application, Ser. No. 166,813, filed May 7, 1917, upon my novel system of electrical construction and apparatus therefor.

In the equipment of electrical power and lighting systems in buildings, factories or the like, it is important and desirable to have adjustable supports and brackets, particularly for lights. My invention comprises a novel type of adjustable bracket, as well as a novel form of construction for the flexible portion of the bracket. I prefer to make such adjustable brackets in two sections, particularly where considerable length of bracket is desired, utilizing a pipe section for a portion of the bracket, which pipe section is preferably adjustably secured to the outlet box on the main conduit pipe, and attached to the pipe section, a suitable length of flexible armored protecting and carrying arm, giving all the adjustability of a "gooseneck" or other construction with universal movability.

It will be appreciated that my novel bracket may be employed either as a combined pipe section and flexible section, or the pipe section itself may constitute the entire bracket; or the flexible arm portion may constitute the entire bracket, although where a considerable length is desired, I prefer to utilize a combination of both, as above explained.

The rigid pipe portion of the bracket is given a universal joint movement through a novel type of ball and socket joint in a cooperating outlet box, together with means to limit the adjustment permitted, when such limit is desirable, together with automatic mechanism which will hold this pipe and ball and socket connection in any angular position to which it is adjusted.

The flexible armored arm portion is also of novel form, and I have discovered that a strong projecting and adjustable arm can be economically manufactured which will not pull apart, which will stay in any position, with considerable rigidity, to which the arm may be turned or adjusted, and yet which will allow entire freedom of movement in all directions. I accomplish this result by having the main armored portion of the bracket united with a cooperating member or members, preferably a wire run lengthwise of the armored portion and secured thereto in any suitable way. This arrangement of a reenforcing, strengthening wire gives great strength to the bracket, preventing the spirally wound metal tape forming the main part of the bracket from pulling apart, and creating sufficient tension to hold the adjustable bracket wherever it is moved. I may desire to stiffen this flexible portion by a plurality of such wires, extending part way along the same.

Referring to the drawings, showing preferred embodiments,

Fig. 1 is a view, partly in cross section, of my novel form of adjustable, flexible armored supporting arm or bracket;

Fig. 2 is a view, partly in cross section, of the bracket support on the main conduit pipe, these two figures corresponding to Figs. 7 and 10 in my said prior application;

Fig. 3 is a view, partly in cross section of the combined conduit pipe and flexible armored bracket, together with the ball and socket connection on the outlet box;

Fig. 4 is a view of one of the clamps;

Fig. 5 is a cross sectional view, on the line 5—5 of Fig. 3;

Fig. 6 is a cross sectional view on the line 6—6 of Fig. 3 looking toward the ball and socket joint;

Fig. 7 is a perspective view of one type of connecting device used on the flexible armored arm; and Fig. 8 is a cross-sectional view on the line 8—8 of Fig. 3.

The form of flexible armored bracket shown in Figs. 1 and 2, may be secured to any desired outlet box, that herein shown being a novel type in the form of a reenforcing and strengthening clamp secured to and carried by the main conduit 1, carrying the current supply wires 2 and 3, said conduit having an outlet section as shown at 4 in dotted lines around which the outlet clamp or box 5 is secured, and through which the nipple 6 extends, lock nuts 7 and 8 holding the same in position to receive the inner end of the spirally wound tape 10, constituting the main portion of the armored flexible bracket and having a lamp socket 11 at its other end. Supply wires to said lamp socket extend through the spirally wound portion 10 to the main supply wires 2 and 3 as will be understood. Positioned longitudinally of the spiral arm 10 is a wire 12, and said wire and spiral arm are secured together, as shown in Fig. 1 by wire meshings 13, also wound spirally, so as to hold the wire 12 in position at a plurality of points, but permitting a slight freedom of movement between the members 12 and 10. A clamp 14 at one end, secured to the nipple 6, and the end portion of the spiral winding, carries a clamping bolt 15 around which the adjacent end of the wire 12 is turned as shown at 16, a similar clamp 17, bolt 18 and curved portion 19 being employed adjacent the socket end 11 of the clamp. The wire 13 may have its respective ends secured to the bolts 15 and 18 also. This construction holds the spiral tape constituting the armored bracket in correctly assembled position, preventing endwise pulling and distortion, and therefore constituting a much stronger connection than has heretofore been made. I prefer to form the spiral tape 10 slightly overlapping, as is usual, but I also prefer to so form the same with a plurality of exterior recesses in which the wire lashing 13 fits, as clearly shown in the drawing. Such spiral wrapping may be conveniently made either as a double tape with one recess formed by a corrugation in the center, or as a slightly concaved wire tape substantially as shown in the drawing. Such spiral tape 10, when assembled as above described, constitutes a form of a well known commercial product designated alternately as " armored conduit," " flexible metallic conduit," and " spirally formed metallic conduit." I have found it advisable to manufacture my own form of this conduit, but it is within the scope of my invention to employ the commercial product. In operating the flexible armored bracket the socket end may be turned and twisted in any desired position or direction, the reenforcing wire 12 and armored portion 10 permitting universal movement and when so moved, the double construction of the arm 10 and wire 12 holds the arm with considerable rigidity in its turned, twisted or adjusted position. The lashings 13 or similar connecting members, afford a relative frictional movement between the wire 12 and the arm. These two longitudinal members seem to effect a slight relative movement around each other, holding the arm strongly and firmly, and substantially without vibration in the new position. This is most important when the bracket is used for concentrating light over special work, such as a machine for example, where a vibratory arm is highly objectionable to the operator. This constant vibration of the prior form of armored adjustable bracket has been one of 'the chief objections to its use, and by my present construction affording a substantially rigid support combined with flexibility and adjustability, I have overcome this prior difficulty and consequently my present flexible arm secures all the advantages of a permanent rigid bracket arm with the important features of flexibility and adjustability. Further, the binding wire 13, making as it does a relatively sharp bend or turn around the reinforcing wire 12, resists any ordinary tendency of the reinforcing wire 12 to move relatively to the armored portion 10. Considerable force is required therefore, because of the sharp bend of the wire 13 over the wire 12, to adjust the flexible arm, which, when adjusted, remains so indefinitely.

In Figs. 3, 4, 5 and 6, I have illustrated a modified form of construction which will now be described. In this form I employ an outlet box in the form of a clamp, consisting in two members 20 and 21, which are held together by bolts 22, 22, 22, and clamped about the conduit pipe. Formed in each member 20 and 21 is a semicircular bearing 23 to receive a correspondingly spherical ball-like member 24, this consisting in a ball and socket joint construction. The member 24 is secured to a rigid pipe 25 in any suitable manner, here shown as by a flaring rim and groove as shown in Fig. 3 at 26. With this construction I apply the faces of the clamping members 20 and 21, where they abut upon and hold the ball like member 24 with sufficient clamping force to give a frictional grip upon the ball like member, sufficient to hold the same and the pipe 25 in any angular position to which the pipe may be adjusted or swung. This provides freedom of adjustment in all directions with an automatic clamping action which holds the pipe 25 in position to which it is moved. I also prefer to provide means which will limit the adjustment of the spherical member 24 in its socket, this comprising recesses 27 and 28 in the clamping members 20 and 21 respectively (see Fig. 6), into which recesses small projections 29 and 30 respectively on the spherical member 24 extend, the walls of said recesses constituting stops against which the projections strike in the swinging of the pipe. This particular construction is of special value when either a movable light or power bracket or fixture which it is desired shall be rigid, like the pipe 25 is employed, or where a relatively long length of bracket or fixture from the main conduit pipes is desired. This ball and socket construction, furthermore, is valuable for use in combination with a flexible armored portion, like that shown in Fig. 1, it being feasible to have a considerable length of rigid pipe such as shown at 25, and a short length of flexible piping, such as 33, connected with the lower end of the pipe 25 and carrying the socket 34 thereon, thus giving adjustability to the socket 24 in addition to the general scope of adjustability to the entire arm consisting in the rigid portion 25 and the flexible portion 35.

Such a combination of rigid and flexible bracket members may be made in many different ways, that herein illustrated consisting in a pair of clamps 36 and 37 (see Fig. 4) carrying bolts 38, 38, these clamps being arranged with an inner peripheral groove 39 adapted to fit upon and interlock with the flared end 40 of the pipe 25, and to also engage and clamp the upper end of the spiral windings constituting the flexible arm 33. In this particular modification I have shown the employment of two wires, 41 and 42, suitable grooves 43 and 44 being provided for these wires in the lower portions of the clamps 36 and 37. As herein illustrated the double wires may run only part way throughout the length of the flexible portion 33, giving additional rigidity and stiffness to the upper portion of the flexible arm and permitting the main flexibility to come near the socket 34, i. e., in the position best suited and most desired for same.

I have also shown in Fig. 3 the binding wires 13 as above explained in connection with the form shown in Fig. 1 and I have illustrated in Figs. 3, 7 and 8 a modified form of spring clamping member 50. This spring clamp is provided with a grooved top, to fit one wire as 12 in Fig. 1 or 42 in Fig. 3, or to fit over both wires, where these are employed, i. e., 41 and 42, this form being clearly illustrated in Fig. 7. These spring clamps constitute as efficient a binding device as the wires 13, and furthermore being somewhat "staggered" to span adjacent spiral portions of the arm 33, they constitute means to retain the spiral members in their lengthwise assembled position, somewhat similar to the result produced by the wires 41 and 42, and in an automatic manner without the addition of a binding wire 13.

The utilization of the flexible arm adjacent the lamp socket in combination with a rigid supporting and carrying bracket 25, which latter may and preferably is attached to the conduit pipes by a suitable bracket, giving the provision of a ball and socket or universal joint adjustability, is of great importance in many lines of work. In high buildings, for example, where the main wires may run near the top and lights must be brought a considerable length to be directly over any desired position, such as a machine, the combination of a rigid bracket member 25, together with the flexible arm 33, is most convenient, the ball and socket adjustment for the entire arm being useful in quickly swinging the light into or out of position, and the flexibility of the socket carrying portion of the entire bracket enabling the light to be concentrated where and when desired, as well as to be moved out of the way of the machine or work when necessary.

My invention is further described and defined in the form of claims as follows:

1. A supporting arm or bracket, comprising a flexible metallic conduit, a bendable reenforcing member extending parallel to, exterior of and substantially throughout the length of said flexible member, and means for binding said reenforcing member and flexible conduit together.

2. A supporting arm or bracket, comprising a spirally formed metallic conduit, a bendable reenforcing member extending parallel to, exterior of and substantially throughout the length of said flexible member and means for binding said reenforcing member and spirally formed flexible conduit together.

3. A supporting arm or bracket, comprising a spirally formed metallic conduit, a bendable reenforcing wire extending substantially throughout the and parallel to the axis of said flexible conduit and binding means between said reenforcing wire and the flexible conduit.

4. A supporting arm or bracket, comprising a flexible metallic conduit, bendable reenforcing wire extending parallel to, exterior of and substantially throughout the length of said flexible member, and means for binding said reenforcing wire to the flexible conduit.

5. A supporting arm or bracket, consisting in a spirally formed metallic tape, a reenforcing rod extending substantially throughout the length of the spiral member, and binding means for securing said reenforcing rod and the spiral member together, whereby the flexibility of the spiral bracket is maintained, and held in any position to which it is adjusted, said reenforcing rod being engaged by collars at each end of the bracket.

6. A supporting arm or bracket, consisting in a spirally formed metallic tape, a reenforcing rod extending substantially throughout the length of the spiral member, and binding means between said reenforcing rod and the spiral member, said binding means consisting in spirally wound metallic lashing, whereby the flexibility of the spiral bracket is maintained, and held in any position to which it is adjusted, said reenforcing rod being engaged by collars at each end of the bracket.

7. A supporting arm or bracket of the kind described, comprising a spirally formed flexible metallic conduit, a reenforcing member extending parallel to, exterior of and substantially throughout the length of said flexible member, means for binding said reenforcing member intermediate its ends to said flexible conduit, and means for anchoring said reenforcing member at each end of said flexible conduit, whereby said flexible conduit is longitudinally strengthened.

8. A supporting arm or bracket of the kind described, comprising a spirally formed flexible metallic conduit, a reenforcing member extending parallel to, exterior of and substantially throughout the length of said flexible member, and means for anchoring each end of said reenforcing member to the said flexible member, whereby said flexible member is longitudinally strengthened.

9. A supporting arm or bracket, comprising a flexible conduit, a lengthwise reinforcing member therefor, means for anchoring the reinforcing member at each end of the conduit, and yielding binding means for holding the reinforcing member and conduit in engagement with each other, and constructed and arranged to permit relative frictional movement of said reinforcing member and conduit.

10. A supporting arm or bracket, comprising a flexible conduit, a lengthwise reenforcing member therefor and lying exterior thereof, and exterior binding means for holding the reinforcing member and flexible conduit together, and being bent over the reinforcing member at a relatively sharp angle, whereby free relative movement of said members is prevented, while relative frictional movement of said members is permitted.

11. A supporting arm or bracket, comprising a flexible conduit, a lengthwise reinforcing member therefor and lying exterior thereof, means for anchoring the reinforcing member at each end of the conduit, and exterior binding means for holding the reinforcing member and flexible conduit together, and being bent over the reinforcing member at a relatively sharp angle, whereby free relative movement of said members is prevented, while relative frictional movement of said members is permitted.

In testimony whereof, I have signed my name to this specification, in the presence of two subscribing witnesses.

ARCHIBALD T. SAMPSON.

Witnesses:
JAMES R. HODDER,
HAROLD J. CLARK.